United States Patent
Greene

(10) Patent No.: US 8,595,991 B1
(45) Date of Patent: *Dec. 3, 2013

(54) DECK FOR ROOF OF GRAIN BIN

(71) Applicant: Rex A. Greene, East Lynn, IL (US)

(72) Inventor: Rex A. Greene, East Lynn, IL (US)

(73) Assignee: Greene Welding and Hardware, Inc., East Lynn, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/870,077

(22) Filed: Apr. 25, 2013

Related U.S. Application Data

(63) Continuation of application No. 13/606,296, filed on Sep. 7, 2012, now Pat. No. 8,434,273.

(51) Int. Cl.
*E04B 7/00* (2006.01)

(52) U.S. Cl.
USPC ............ 52/82; 52/182; 52/187; 52/192

(58) Field of Classification Search
USPC ............ 52/82, 182, 187, 192, 193, 194, 195, 52/196, 223.3, 244, 245, 650.3, 745.01; 296/45, 82, 128
See application file for complete search history.

(56) References Cited

U.S. PATENT DOCUMENTS

| | | |
|---|---|---|
| 1,732,400 A | 10/1929 | Eaton |
| 1,981,422 A | 11/1934 | Kreutzer |
| 2,623,643 A | 12/1952 | Seamans |
| 3,583,112 A | 6/1971 | Kennedy |
| 3,595,510 A | 7/1971 | Hutchinson |
| 4,143,740 A | 3/1979 | Matthews |
| 4,355,700 A | 10/1982 | Matthews et al. |
| 4,419,851 A | 12/1983 | Kruger |
| 4,527,366 A | 7/1985 | Greene et al. |
| 4,867,046 A | 9/1989 | Yoder |
| 5,586,678 A | 12/1996 | Rosch et al. |
| 5,638,917 A | 6/1997 | Vennen |
| 5,829,549 A | 11/1998 | Flynn |
| 6,698,143 B2 | 3/2004 | Jensen et al. |
| 6,886,662 B2 | 5/2005 | Riley |
| 7,487,619 B2 | 2/2009 | Glenn |
| 8,220,207 B2 | 7/2012 | Shan et al. |
| 2003/0217520 A1 | 11/2003 | Jensen et al. |
| 2006/0213722 A1 | 9/2006 | Cunningham |
| 2008/0155909 A1 | 7/2008 | Grossman et al. |
| 2010/0139185 A1 | 6/2010 | Neighbors |

*Primary Examiner* — James Buckle, Jr.
(74) *Attorney, Agent, or Firm* — Cook Alex Ltd.

(57) ABSTRACT

A deck for the roof of a grain bin includes a plurality of deck units each having a plate having an upper face and a lower face and openings spaced from each other and adjacent each longitudinal edge of the plate. The spacing of some of the openings is substantially the same as the spacing of openings in the roof whereby the plate may be attached to the roof. A pair of ring segments extend substantially perpendicular to the elongate plate and rest upon the plate. Openings are in the ring segments and at least one of which is aligned with openings in the plate whereby the ring segments may be attached to the upper face of the plate. A riser extends upwardly from the ring segments opposite the plate, and the riser and ring segments are attached. A deck plate is attached to the riser opposite the ring segments.

14 Claims, 2 Drawing Sheets

DECK FOR ROOF OF GRAIN BIN

RELATED APPLICATION

This application is a continuation of application Ser. No. 13/606,296, filed Sep. 7, 2012 which application is incorporated herein by reference in its entirety.

BACKGROUND AND SUMMARY OF THE INVENTION

The present invention relates to a deck for assembling on the inclined roof of a cylindrical storage structure. Cylindrical storage structures having inclined roofs, such as grain bins for the storage of grain, are typically filled by conveying the grain to the peak of the roof through an access which may be opened to admit the grain and closed to protect the grain from weather once the grain is in the grain bin. To ensure proper ventilation of the grain bin, several power exhaust fans are typically located on the inclined roof toward its top, and the fans are spaced from each around the curvature of the roof.

Once the grain has been admitted to the grain bin, the only reasonable access to these power exhaust fans to service them is from the roof of the grain bin. In order to facilitate the servicing of these power exhaust fans, the present inventor has offered a deck which is mounted on the roof of the grain bin in proximity to the exhaust fans to permit access to the fans from the roof by service personnel.

Grain bins come in a variety of sizes and configurations depending upon the manufacturer, and the location of the power exhaust fans along the incline of the roof frequently varies depending upon the grain bin manufacturer. Because of this and for other reasons, the deck which the present inventor has offered and which was to be assembled on any particular grain bin needed to be formed of components which were custom sized and shaped to fit the particular size and configuration of that manufacturer's bin. Thus, the dimensions of the various components of the deck, such as the deck plates, hand rails and the like, were custom sized and configured for each given grain bin.

The present invention has the purpose of overcoming the need for such customization of the sizes and shapes of the components needed to assemble a deck on a given grain bin. In the present invention, all of the components of the deck of the present invention may be of standard uniform size and shape without regard to the size of the grain bin or its configuration, the spacing of the roof ribs on the grain bin or fastener openings in the ribs, or the manufacturer of the grain bin. This substantially facilitates the assembly of the deck and substantially reduces the inventory of components needed to accommodate the several different grain bins that are currently on the market.

In one principal aspect of the present invention, a deck for the inclined roof of a generally cylindrical storage structure comprises an elongate plate extending substantially parallel to the incline of the roof and having an upper face and a lower face facing the roof, a first pair of openings longitudinally spaced from each other and adjacent one longitudinal edge of the plate, and a second pair of openings longitudinally spaced from each other and adjacent the other longitudinal edge of the plate. The spacing of the first pair of openings is substantially the same as the spacing of openings in the roof whereby the plate may be attached to the roof with the lower face facing the roof by fastening means extending through the first openings and the openings in the roof. A pair of ring segments spaced from each other in the direction of the incline of the roof extend substantially perpendicular to the elongate plate and are constructed and arranged to rest upon the upper face of the plate. A plurality of openings are in the ring segments and at least one of these openings is aligned with the second pair of openings in the elongate plate whereby the ring segments may be attached to the upper face of the plate by fastening means extending through at least one opening in each of the ring segments and the second openings in the plate. A riser extends substantially parallel to the incline of the roof and upwardly from the side of the ring segments opposite the plate, and the riser and ring segments have fastening means for attaching them together. A deck plate extends substantially horizontally from the inclined roof and on the top of the riser opposite the ring segments, and the riser and deck plate have fastening means for attaching them together.

In another principal aspect of the present invention, the ring segments have a plurality of openings spaced from each other along the length of the ring segments.

In still another principal aspect of the present invention, the openings in the ring segments are slots.

In still another principal aspect of the present invention, the riser is substantially triangular in outline.

In still another principal aspect of the present invention, the deck includes a plurality of the elongate plates, a plurality of the ring segments arranged in end to end relationship to each other and attached to each other, a plurality of the risers, and a plurality of the deck plates also arranged in end to end relationship to each other and attached to each other and to the risers.

In still another principal aspect of the present invention, spaced openings are located adjacent to the ends of the deck plates, a splice plate having first openings spaced from each other and adjacent one longitudinal edge of said splice plate and second openings spaced from each other and adjacent the other longitudinal edge of said splice plate are provided, and fastening means fastens the splice plate between the riser and the openings adjacent to ends of the deck plates to splice adjacent deck plates together.

In still another principal aspect of the present invention, at least some of the openings at either of the ends of the deck plates or in the splice plate are slots.

In still another principal aspect of the present invention, the deck includes a plurality of hand rails comprising substantially vertical posts attached at one end to the risers, and a plurality of horizontal rails attached to the posts toward other end of the post.

In still another principal aspect of the present invention, the ring segments flex to permit the ring segments to conform to the curvature of the roof.

In still another principal aspect of the present invention, the ring segments are substantially Z-shaped in cross section comprising an upper and lower flange extending in opposite directions from a web connecting the flanges, the lower flange including the openings in the ring segments, and the flanges including spaced slots which permit the ring segments to flex.

In still another principal aspect of the present invention, the generally cylindrical storage container is a grain bin.

These and other objects, features and advantages of the present invention will become readily understood upon a consideration of the following detailed description.

BRIEF DESCRIPTION OF THE DRAWINGS

In the course of this description, the drawings will frequently be referred to in which.

DESCRIPTION OF THE PREFERRED EMBODIMENT

Figure 1:
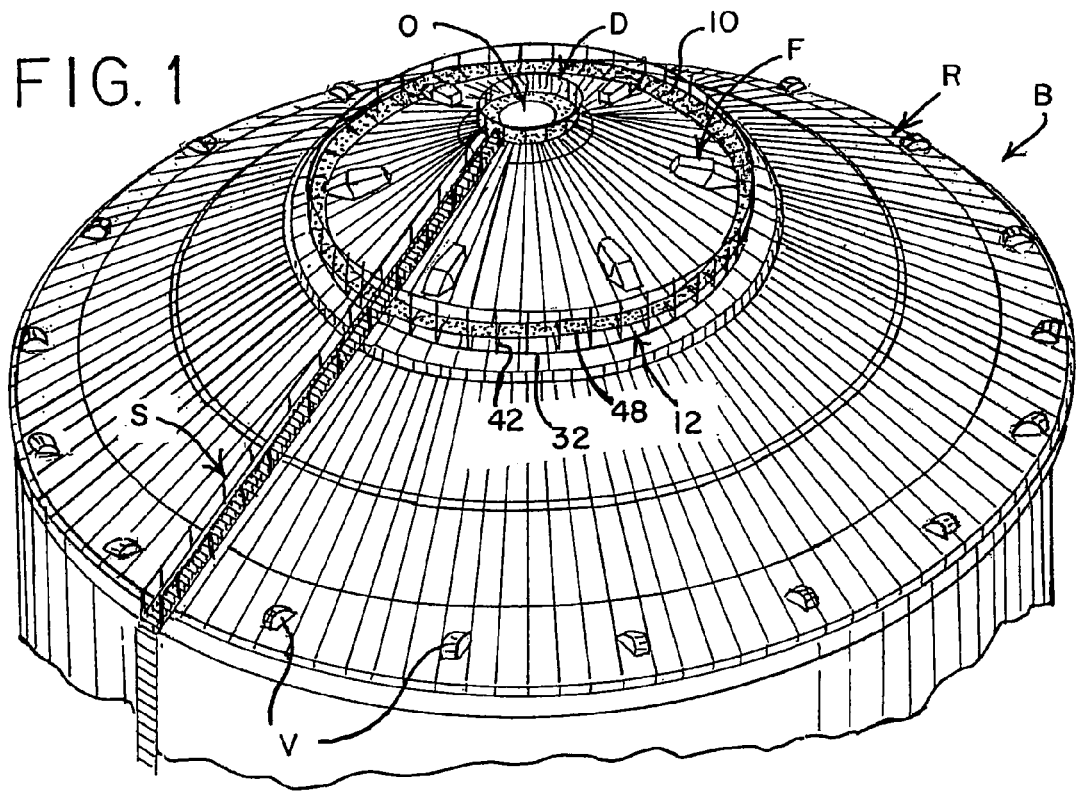
FIG. 1 is a perspective, broken view of the top of a grain bin including a deck on its inclined roof incorporating the principles of the present invention.

As shown in FIG. 1, a generally cylindrical storage structure, such as a grain bin B for the storage of grain, is shown having an inclined roof R. In such grain bins the grain is loaded by a conveyor (not shown) into the bin through an access opening O at the top apex of the roof R. Once the grain has been loaded into the bin, the opening O is closed by a closure (not shown) to prevent the entry of rain and other foreign materials into the bin.

In order to facilitate the loading of the grain bin B, a small deck D is typically located adjacent to the opening O.

Power exhaust fans F are also typically mounted to the roof R near the top of the roof but somewhat down the incline from the deck D and access opening O and vents V are spaced from each other around the bottom of the roof as seen in FIG. 1. The power exhaust fans F are spaced from each other around the curvature of the roof R as seen in FIG. 1 and by drawing in air through the vents V the interior of the grain bin is ventilated to remove undesirable moisture and possibly hazardous dust from the grain bin B. It is important that the power exhaust fans are operative to perform their function so it is desirable to be able to service these fans on an ongoing basis to ensure their continuing operation. However, access to these fans for that purpose from the interior of the filled grain bin is limited. Accordingly, in the past a deck 10 has been constructed on the inclined roof adjacent the power exhaust fans F and on the exterior of the roof R to permit access for the servicing of the power exhaust fans. Both the exhaust fan deck 10 and the deck D at the top of the grain bin have also in the past been accessed by steps S as shown in FIG. 1.

As previously discussed, the deck 10 in the past has been constructed by the assembly of a variety of components which have been custom sized and shaped to conform to a given manufacturer's grain bin. This is because each of the respective manufacturer's grain bins are of different sizes and configurations and the roof ribs of the different manufacturers have openings used to assemble the roof which differ in spacing from each other depending on the manufacturer of the grain bin. Because these roof rib openings are to be also utilized to attach the deck to the roof, this difference in opening spacing required further customization of the components. Moreover, the power exhaust fans F may be placed at different locations down the incline of the roof from the opening O depending upon the manufacturer. Thus, at the location at which the deck 10 is to be assembled, the spacing of the roof ribs may be different depending upon the positioning of the power exhaust fans F of different manufacturers. This has necessitated customization of the various deck components to accommodate the respective configurations of the individual different grain bin manufacturers.

As previously mentioned in the present invention the need for such customization of the size and shape of the components needed to construct the deck 10 is obviated. In the present invention, substantially all of the components of the deck may be of standard, uniform size and shape without regard to the features of the grain bin, the spacing of the roof assembly components or the roof ribs, or the manufacturer of the grain bin. This substantially facilitates the assembly of the deck and substantially reduces the inventory of components needed to accommodate the several different manufacturer's grain bins that are currently on the market.

Figure 2:
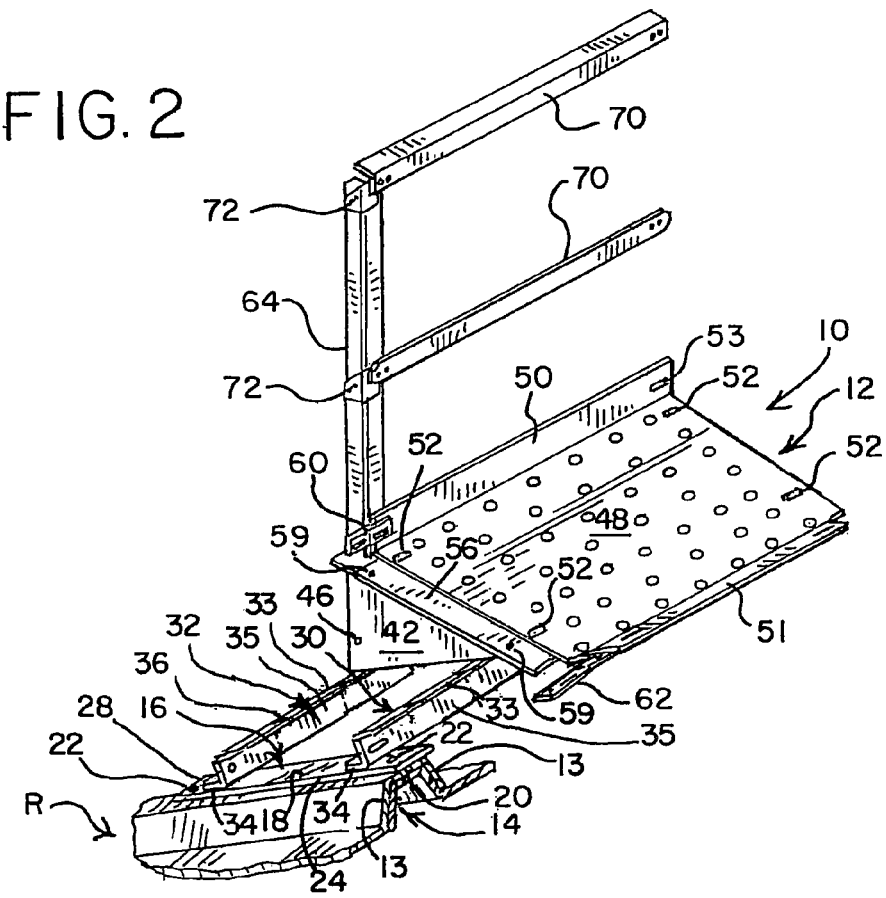
FIG. 2 is an enlarged, broken view of a single deck unit assembled and mounted to the roof of the grain bin shown in FIG. 1.
Figure 3:
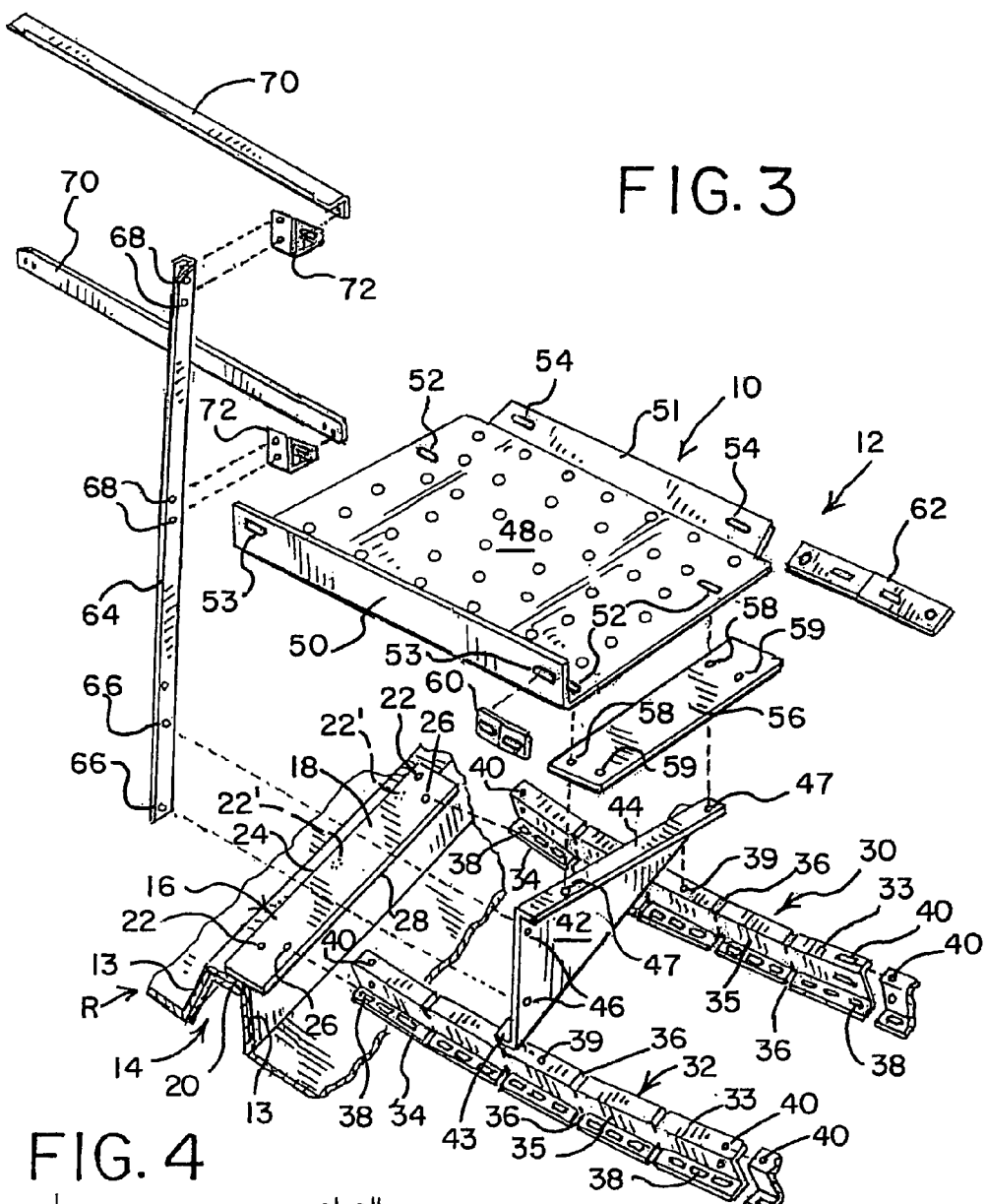
FIG. 3 is an exploded view of the single deck unit shown in FIG. 2 and showing its individual components.

The deck 10 of the present invention as shown in FIG. 1 comprises a plurality of end to end deck units 12 as are shown in FIGS. 2 and 3. The deck units 12 comprise a plurality of components which are constructed and designed to be assembled together to form each deck unit and the deck units are mounted to the roof ribs 14 of the roof R as seen in FIG. 2. In the conventional grain bin roof R and its ribs 14, each of the roof panels typically includes a raised channel 13 along each edge. The channel 13 along the longitudinal edge of one roof panel is placed in overlying relation to the channel 13 of the next adjacent roof panel to define a roof rib 14 which extends up the incline of the roof as seen in FIGS. 2 and 3. The channels 13 include openings (not shown) which are spaced intermittently along the longitudinal length of the channels to receive fastening means for fastening the channels together to form the roof R.

One of the problems encountered by the subject roof decks in the past is that they are typically attached by the same fastening means, such as bolts or rivets, that the channels are attached together by and, depending upon the manufacturer, the distance between the fastening openings in the channels 13 and roof ribs 14 may differ from each other between manufacturers. Also depending on the location of the power exhaust fans F relative to the top and the bottom of the inclined roof, the distance between adjacent roof ribs 14 at the location that the deck is to be assembled may vary around the surface of the inclined roof. These variables have necessitated the need to customize the different deck components to accommodate each manufacturer's variables.

In the deck 10 of the present invention, each of the deck units 12 comprises an elongate plate 16 which extends parallel to the incline of the roof. The plate 16 has an upper face 18 and a lower face 20 the latter of which faces the roof rib 14. The elongated plate 16 also includes at least a pair of openings 22 spaced along one of the longitudinal edges 24 of the plate. The distance between the openings 22 coincides with the distance between the openings (not shown) through the channels 13 of the roof ribs 14 so that the plate 16 may be fastened to the roof ribs 14 by the same fastening means by which the roof rib channels 13 are fastened together. Additional openings 22' as seen in dot and dash in FIG. 3 may also be included either with the openings 22 in the plate 16 or may be subsequently added to the plate to accommodate different distances between the openings in the roof channels 13 of other manufacturers, thus adapting the plate 16 to the opening spacings of several different manufacturers. The elongate plate 16 also includes an additional pair of spaced openings 26 longitudinally spaced from each other and adjacent the other longitudinal edge 28 of the elongate plate 16. The purpose of openings 26 will be further described to follow.

Each deck unit 12 further includes a pair of ring segments 30 and 32, as seen in FIGS. 2 and 3, which are spaced from each other in the direction of the incline of the roof and which extend substantially perpendicular to the elongate plates 16 and are constructed and arranged to rest upon the upper face 18 of the plates 16 as shown in FIG. 2. Each of the ring segments 30 and 32 is substantially Z-shaped in cross section and comprises an upper flange 33 and a lower flange 34 extending in opposite directions from a web 35 which connects the flanges 33 and 34. The upper and lower flanges 33 and 34 also are periodically slotted at 36 to permit the ring segments 30 and 32 to flex and bend to conform with the curvature of the roof R. The lower flanges 34 of each of the ring segments 30 and 32 also include a plurality of longitudinally extending spaced slots 38 along their length as best seen in FIG. 3. This permits the ring segments 30 and 32 to be fastened by suitable fastening means such, as a bolt or rivet, through the openings 26 in the elongate plate 16 anywhere along the length of the ring segments 30 and 32. This permits the ring segments to be of standard length and yet be able to accommodate attachment to the elongate plates 16 at any location along their length without regard to the spacing between the roof ribs 14 from each other.

The ring segments 30 and 32 also include openings 40 at each end as best seen in FIG. 3 to permit next adjacent ring segments to be attached together at their ends through the openings 40 to form a continuous ring around the roof R. Opening 40 in the inner ring segment 30 is preferably slotted to allow longitudinal adjustment due to the slightly greater degree of curvature of the inner ring segment. Again, this permits accommodation of somewhat varying roof configurations between manufacturers and the standardization of the ring segment components of the deck unit 12. The upper flanges 33 of the ring segments 30 and 32 also include an opening 39 intermediate the lengths of the ring segments as best seen in FIG. 3 for a purpose which will be described to follow.

Each of the deck units 12 also includes a riser 42 which is generally triangular in outline and which has the purpose of supporting the deck plate of each of the deck units 12 to extend horizontally from the roof R. The riser 42 is preferably generally Z-shaped in cross section and has a lower flange 43 and an upper flange 44, as best seen in FIG. 3. The lower flange 43 of the riser 42 has openings (not shown) which align with the openings 39 in the upper flanges 33 of the ring segments 30 and 32 to receive fastening means for fastening the riser 42 to the ring segments 30 and 32. The riser 42 also has openings 46 along the longer vertical edge of the riser and openings 47 through the upper flange 44 for purposes which will be described to follow.

Each of the deck units 12 also includes a deck plate 48 which forms the walking surface of the deck 10. Each deck plate 48 preferably includes a vertical upwardly extending flange 50 which extends along the outer edge of the deck plate, and an angled flange 51 which extends along the inner edge of the plate 48 and which rests against the roof ribs 14. The deck plate 48 also includes a pair of spaced slotted openings 52 at each end. The flanges 50 and 51 of the deck plate 48 also include slotted openings 53 and 54 at each end for attaching adjacent deck plates 48 to each other during the assembly of the deck 10.

A splice plate 56 is also provided at the ends of the deck plate 48 for splicing adjacent deck plates together. The splice plate 56 includes a pair of openings 58 along one longitudinal edge, and another pair of spaced openings 59 along the opposite longitudinal edge as best seen in FIG. 3.

During the assembly of the deck units 12, the splice plate 56 is positioned so that its openings 58 are beneath and aligned with the slots 52 in the end of a deck plate 48 and with the openings 47 in the upper flange 44 of the riser 42, and fastening means, such as a bolt or rivet, extends through these openings to attach the deck plate 48, splice plate 56 and upper flange 44 of the riser 42 together in that order. The other edge of the splice plate 56 overhangs the upper flange 44 of the riser 42 and the other openings 59 are positioned beneath the slotted openings 52 at the end of the next adjacent deck plate 48 to attach the two consecutive deck plates together. The slotted openings 52 in the deck plates 48 permit the deck plates to compensate for any minor misalignments that may exist.

A splice plate 60 having slots therein is also preferably positioned to attach the outer flanges 50 of adjacent deck plates together by way of fastening means which extend through the slots of the splice plate 60 and the slot 53 at the ends of the flange 50.

A splice plate 62 with slots and openings therein is also preferably provided to attach adjacent ends of the angled flanges 51 together as shown in FIG. 3.

Finally, the various components of the hand rails are attached to the deck units 12. The hand rail assembly comprises a vertical post 64 having openings 66 at the bottom which are aligned with the openings 46 in the riser 42 to attach the post 64 along the longer edge of the riser 42. The post also includes additional openings 68 toward the other end of the post to permit attaching one or more horizontal rails 70 further up the post 64 by way of suitable couplers 72.

As previously discussed the deck construction of the present invention permits the deck to be assembled utilizing standard single sized and configured components without regard to the differences in construction and spacing of roof components that are supplied by a range of different manufacturers.

Figure 4:
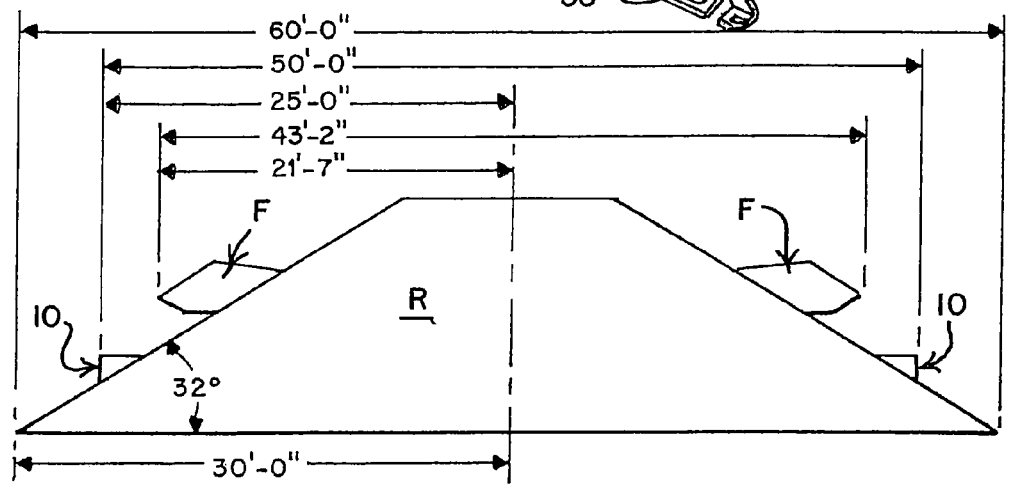
FIG. 4 is a schematic view of the inclined roof in cross section and the positioning of the power exhaust fans and deck together with some dimensions that may be included in the calculations of how many deck components are needed for a given roof.

Moreover, the component needs to complete the construction of the deck may be readily and easily calculated prior to delivery of these standard components to the construction site. Reference will be made to FIG. 4 in a brief discussion of such calculations to follow. These calculations are based on standard sized deck plates 48 in which for example the length of the deck plates 48 is approximately 36 inches and the width of the plates is approximately 28 inches.

The outside radius of the power exhaust fans F is first measured, and in the example shown in FIG. 4, the radius is 21'-7".

This radius is then multiplied by two with the result of 43'-2" and that is rounded upward to 44' to get the diameter.

Six is then added to the 44' diameter to accommodate for the width of the deck and provide at least 36 inches of hip room, thus, 44'+6'=50 sections or deck units 12 which need to be ordered to complete the assembly.

It will be appreciated that any other minor variations in dimensions may be readily accommodated during assembly by provision of the numerous slotted openings which allow for adjustment to compensate for minor variations, for example, in the curvature difference between the inner ring segments 30 and outer ring segments 32.

It will also be appreciated that the preferred embodiment of the invention which has been described as merely illustrative of only a few of the principles of the present invention. Numerous modifications may be made by those skilled in the art without departing from the true spirit and scope of the present invention.

The invention claimed is:

1. A deck for a roof of a generally cylindrical storage structure, the deck comprising:
   a plate having an upper face and a lower face, openings spaced from each other and adjacent each longitudinal edge of said plate the spacing of some of the openings being substantially the same as the spacing of openings in the roof whereby the plate may be attached to the roof;

a pair of ring segments extending substantially perpendicular to said plate and which rest upon said plate, openings in each of said ring segments at least one of which is aligned with openings in said plate whereby said ring segments may be attached to said upper face of said plate;

a riser extending upwardly from said ring segments opposite said plate, said riser and said ring segments being attached together; and a deck plate attached to said riser opposite said ring segments.

2. The deck of claim 1, wherein said ring segments have a plurality of said openings spaced from each other along the length of said ring segments.

3. The deck of claim 2, wherein said openings in said ring segments are slots.

4. The deck of claim 3, wherein said riser is substantially triangular in outline.

5. The deck of claim 1, wherein said riser is substantially triangular in outline.

6. The deck of claim 1, including a plurality of said elongate plates, a plurality of said ring segments arranged in end to end relationship to each other and attached to each other, a plurality of said risers, and a plurality of said deck plates also arranged in end to end relationship to each other and attached to each other and to said risers.

7. The deck of claim 6, including spaced openings adjacent the ends of said deck plates, a splice plate having first openings spaced from each other and adjacent one longitudinal edge of said splice plate and second openings spaced from each other and adjacent the other longitudinal edge of said splice plate, and fastening means for fastening said splice plate between said riser and said openings adjacent to ends of said deck plates to splice adjacent deck plates together.

8. The deck of claim 7, wherein at least some of the openings at either the ends of the deck plate or in the splice plate are slots.

9. The deck of claim 6, including a plurality of hand rails comprising substantially vertical posts attached at one end to said risers, and a plurality of horizontal rails attached to said posts toward the other end of the posts.

10. The deck of claim 1, including a hand rail comprising a substantially vertical post attached at one end to said riser and at least one horizontal rail attached to said post toward its other end.

11. The deck of claim 1, wherein said ring segments flex to permit said ring segments to conform to the curvature of the roof.

12. The deck of claim 11, wherein said ring segments are substantially Z-shaped in cross section comprising an upper and lower flange extending in opposite directions from a web connecting the flanges, said lower flange including said openings in said ring segments, and said flanges including spaced slots which permit said ring segments to flex.

13. The deck of claim 1, wherein the generally cylindrical storage structure is a grain bin.

14. The deck of claim 6, wherein the generally cylindrical storage structure is a grain bin.

* * * * *